(12) United States Patent
Shalev et al.

(10) Patent No.: US 11,494,288 B2
(45) Date of Patent: Nov. 8, 2022

(54) TEST RELEVANCY PREDICTION FOR CODE CHANGES

(71) Applicant: EntIT Software LLC, Sunnyvale, CA (US)

(72) Inventors: Gabi Shalev, Yehud (IL); Itay Ben-Yehuda, Yehud (IL); Raz Regev, Yehud (IL); Elad Benedict, Yehud (IL)

(73) Assignee: MICRO FOCUS LLC, Sanford, NC (US)

( * ) Notice: Subject to any disclaimer, the term of this patent is extended or adjusted under 35 U.S.C. 154(b) by 118 days.

(21) Appl. No.: 15/680,092

(22) Filed: Aug. 17, 2017

(65) Prior Publication Data
US 2019/0057014 A1 Feb. 21, 2019

(51) Int. Cl.
*G06F 16/31* (2019.01)
*G06F 11/36* (2006.01)

(52) U.S. Cl.
CPC ........ *G06F 11/368* (2013.01); *G06F 11/3688* (2013.01); *G06F 11/3692* (2013.01)

(58) Field of Classification Search
CPC ............... G06F 11/368; G06F 11/3688; G06F 11/3692; G06F 16/313; G06F 16/31
USPC .................................................. 717/100–168
See application file for complete search history.

(56) References Cited

U.S. PATENT DOCUMENTS

| | | | |
|---|---|---|---|
| 8,312,430 B2 | 11/2012 | Best et al. | |
| 8,745,589 B2 | 6/2014 | Arumugham et al. | |
| 9,032,369 B2 | 5/2015 | Balakrishnan et al. | |
| 10,026,053 B1* | 7/2018 | Narayan | G06Q 10/067 |
| 10,133,791 B1* | 11/2018 | Chan | G06F 16/22 |
| 10,860,465 B2* | 12/2020 | Elimeleh | G06F 16/00 |
| 2009/0222234 A1* | 9/2009 | Dmitriev-Zdorov | H04L 43/50 702/119 |
| 2016/0026554 A1* | 1/2016 | Geheb | G06F 11/3688 714/38.1 |
| 2016/0034270 A1* | 2/2016 | Swierc | G06F 11/3668 717/126 |
| 2016/0306613 A1* | 10/2016 | Busi | G06F 11/3668 |
| 2018/0349257 A1* | 12/2018 | Bhattacharjee | G06F 11/3688 |

OTHER PUBLICATIONS

Fluri et al., "Change Distilling: Tree Differencing for Fine-Grained Source Code Change Extraction", Nov. 2017 (Year: 2017).*
Ripon K. Saha et al . . . , "An Information Retrieval Approach for Regression Test Prioritization Based on Program Changes", 2015 (Year: 2015).*

(Continued)

*Primary Examiner* — Chat C Do
*Assistant Examiner* — Noor Alkhateeb

(57) ABSTRACT

In some examples, test relevancy prediction for code changes may include ascertaining files for a commit for a build, and for each test of a plurality of tests, determining a score based on a weight assigned to a file of the ascertained files. Test relevancy prediction for code changes may further include ordering each test of the plurality of tests according to the determined score, and identifying, based on the ordering of each test of the plurality of tests, tests from the plurality of tests for which the score exceeds a specified threshold. The identified tests may represent tests that are to be applied to the build.

16 Claims, 7 Drawing Sheets

(56) References Cited

OTHER PUBLICATIONS

Muhammad Khatibsyarbini et al., "A Hybrid Weight-Based and String Distances Using Particle Swarm Optimization for Prioritizing Test Cases", Jun. 30, 2017 (Year: 2017).*
Hornbeek, M., "Relevant Continuous Testing: the Primary Key to Devops", Jan. 19, 2017, pp. 5. https://devops.com/relevant-continuous-testing-primary-key-devops.
Dunn Ekelund, E., "Test Selection Based on Historical Test Data", 2015, pp. 60. http://lup.lub.lu.se/luur/downtoad?func=downloadFile&recordOld=7358122&fileOld=7358451.
Garcia, V., "The Tuenti Release and Development Process: Conclusion and the Future", Jan. 14, 2014, pp. 15. http://corporate.tuenti.com/en/dev/blog/tags/continuous%20integration.

* cited by examiner

| Build Number | Commits | Failed Tests |
|---|---|---|
| 1 | 101, 103, 105, 107, 109 | None |
| 2 | 111, 112, 113, 114, 115, 116 | Test TTT |
| 3 | 120 | None |
| 4 | 130, 131, 132 | None |
| | | |
| | | |

*FIG. 2*

| Test - TTT | |
|---|---|
| File | Count |
| a.java | 1 |
| b.js | 1 |
| c.groovy | 1 |
| | |
| | |

*FIG. 3*

| Build Number | Commits | Failed Tests |
|---|---|---|
| 1 | 101, 103, 105, 107, 109 | None |
| 2 | 111, 112, 113, 114, 115, 116 | Test TTT |
| 3 | 120 | None |
| 4 | 130, 131, 132 | None |
| 5 | 140, 141, 142, 143, 144, 145, 146, 147, 148, 149 | Test TTT, Test MMM |
| 6 | 150, 151 | None |

*FIG. 4*

| Test - TTT ||
|---|---|
| File | Count |
| a.java | 2 |
| b.js | 1 |
| c.groovy | 1 |
| f.js | 1 |
| m.java | 1 |

| Test - MMM ||
|---|---|
| File | Count |
| f.js | 1 |
| m.java | 1 |

*FIG. 5*

| File - a.java | |
|---|---|
| Test | Count |
| TTT | 2 |
| | |
| | |
| | |
| | |

| File - f.js | |
|---|---|
| Test | Count |
| TTT | 1 |
| MMM | 1 |
| | |
| | |
| | |

IDENTIFY A TEST AND FILE PAIR IN A SET OF BUILDS
802

FOR THE IDENTIFIED TEST AND FILE PAIR, LOGGING AN OCCURRENCE OF A FILE INCLUDED IN THE TEST AND FILE PAIR, THE LOGGING ASSOCIATED WITH THE FAILED TEST AND THE PASSED TEST
804

TEST RELEVANCY PREDICTION FOR CODE CHANGES

BACKGROUND

In software development, a codebase may represent a set of source code files from which an end product is created. The process of creating the end product, which may also be referred to as building the end product or a build, may vary based on the type of codebase. For example, the end product may be created by compiling and linking source code files or by arranging and packaging the source code files into a package that is later executed by an interpreter. In this regard, the functionality of the end product may be defined by the codebase.

When changes to the end product are needed (e.g., new features, bug fixes, etc.), software developers may make changes to the files of the codebase. For example, a software developer may group the desired changes for submission to the codebase in what is called a commit. The codebase may pick up the commit and include the changes the software developer made in the next build of the end product.

BRIEF DESCRIPTION OF DRAWINGS

Features of the present disclosure are illustrated by way of example and not limited in the following figure(s), in which like numerals indicate like elements, in which:

FIG. 2 illustrates an example of build related data that may be stored and utilized by the techniques described herein;

FIG. 3 illustrates an example of a test and file pair collection that may be stored and utilized by the techniques described herein;

FIG. 4 illustrates an example of build related data that may be stored and utilized by the techniques described herein;

FIG. 5 illustrates an example of test and file pair collections that may be stored and utilized by the techniques described herein;

FIG. 6 illustrates an example of file collections that may be stored and utilized by the techniques described herein;

DETAILED DESCRIPTION

Figure 1:
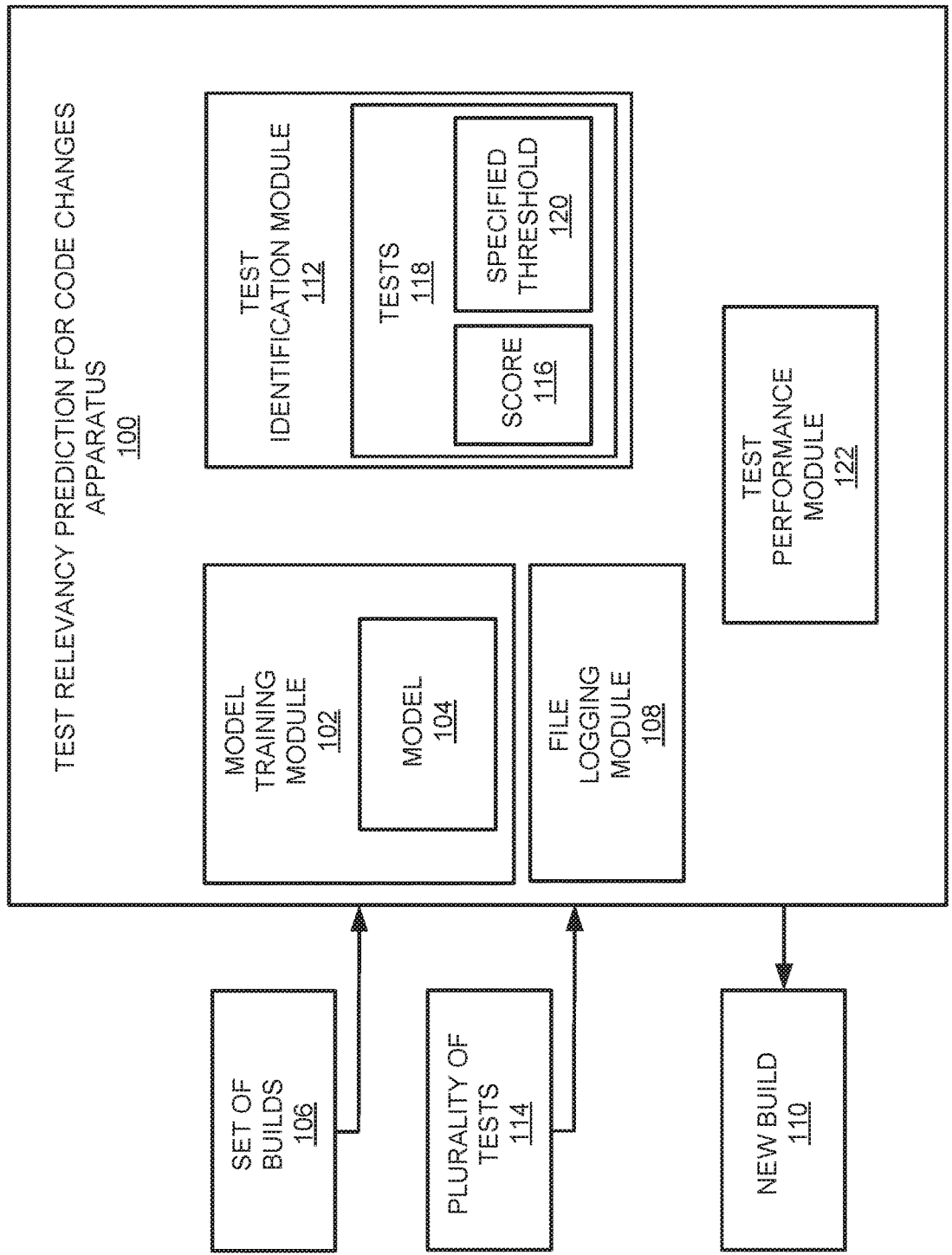
FIG. 1 illustrates an example layout of a test relevancy prediction for code changes apparatus.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Test relevancy prediction for code changes apparatuses, methods for test relevancy prediction for code changes, and non-transitory computer readable media having stored thereon machine readable instructions to provide test relevancy prediction for code changes are disclosed herein. The apparatuses, methods, and non-transitory computer readable media disclosed herein provide for determination, for example, by prediction, of which tests are most relevant to a given code change before the code change is committed/pushed within a system, such as a Source Control Management system. This insight may help users, such as developers, run specific tests before code changes are pushed in order to avoid failing a build in a system, such as a Continuous Integration system. This insight may also help users integrate results into a Continuous Integration job to facilitate the composition of tests run for a new build. The apparatuses, methods, and non-transitory computer readable media disclosed herein may use statistical and machine learning techniques to analyze historical data for previous code changes and test runs to train a model, and use the trained model to predict which tests will be most relevant to run for pending code changes.

Continuous Integration systems may involve periodic builds based on the current codebase at the time of the build. In this regard, each build may include any number of commits that may need to be analyzed so that the commits do not cause functional regressions. That is, the commits may need to be checked to ensure that they do not introduce error, often referred to as bugs, to the codebase. This verification may be performed by running (e.g., by executing) a suite of tests on each build. The suite may be composed of a static set of tests that may cover a large and general set of core functionalities, or use cases that code changes may affect. Running such a suite may take a relatively long amount of time, and may not include the tests that are most relevant to specific code changes. These aspects may result in delay of the detection of problems until a later time, perhaps when a more comprehensive suite of tests is run. Furthermore, in order to avoid causing functional regressions, developers may test their code changes prior to integration into a common codebase. In this regard, it may be technically challenging to decide which tests are actually relevant out of a potentially overwhelmingly large set of tests.

With respect to regression testing, choosing the correct tests to run may need familiarization with a large set of tests, and may be technically challenging when the set of tests is extensively large, or when a developer works on a unfamiliar product area. As a result, developers may either run general suites of tests or need to consult with an expert who may become a bottleneck in the process.

In order to perform regression testing on a codebase, multiple static suites of tests may be defined, each one aiming to cover a different product area or flow (e.g., a category). Each code change may then be linked to categories, and this combination of categories may be used to yield a more relevant set of tests to run. However, although the suites of tests may include greater granularity, the suite of tests is still static. Further, the set of categories may become large and technically challenging to maintain. Yet further, it may be technically challenging to determine which categories are to be assigned to a given code change.

In order to address at least the aforementioned technical challenges with respect to regression testing, according to an example, the apparatuses, methods, and non-transitory computer readable media disclosed herein provide a two phase approach for predicting relevancy of tests for code changes.

In a first phase, a model may be trained based on historical build data. This historical build data may be analyzed to identify sequences of builds that include a failing test and then a build that includes a fix (e.g., no failing tests). For example, the model may be trained by identifying a test and file pair in a set of builds, where the set of builds is associated with a failed test and a passed test. For the identified test and file pair, an occurrence of a file included in the test and file pair may be logged, with the logging being associated with the failed test and the passed test.

In a second phase, once the model is trained, files for a new commit for a build may be ascertained. For each test of a plurality of tests, a score may be determined based on a weight assigned to a file of the ascertained files. Each test of the plurality of tests may be ordered according to the determined score. Further, tests from the plurality of tests for which the score exceeds a specified threshold may be identified based on the ordering of each test of the plurality of tests. The identified tests may represent tests that are to be applied to the build for regression testing.

The apparatuses, methods, and non-transitory computer readable media disclosed herein may be implemented based, for example, on two definitions of a set of code changes, the first being a Source Control Management commit, and the second being the set of file changes ready to be committed next (e.g., in the Source Control Management system, these changes may be included in the staging area). The difference between the approaches with respect to these definitions is how the set of changes may be retrieved. Each approach may be utilized for a Source Control Management system. Accordingly, the discussion below is with respect to the Source Control Management commit, but may be similarly applied to the set of file changes ready to be committed next.

For the apparatuses, methods, and non-transitory computer readable media disclosed herein, tests that did not fail may not be linked to code changes without performing complex code analysis. However, since such complex code analysis is not performed herein, the apparatuses, methods, and non-transitory computer readable media disclosed herein provide for determination of tests to be applied to a build based on historical data on test failures.

According to an example, for the apparatuses, methods, and non-transitory computer readable media disclosed herein, test relevancy prediction may be performed independently of user input or feedback, as the prediction may be performed from data already available in Continuous Integration systems.

According to an example, the apparatuses, methods, and non-transitory computer readable media disclosed herein may be integrated within an existing Application Lifecycle Management (ALM) system, enabling modification of the test relevancy prediction accuracy based on data typically available in such systems.

According to an example, the apparatuses, methods, and non-transitory computer readable media disclosed herein may operate independently from a programming languages or frameworks for a project.

According to an example, the apparatuses, methods, and non-transitory computer readable media disclosed herein may eliminate the need for a user to probe the user's codebase, or manipulate the user's Continuous Integration system in order to analyze the relevant code.

With respect to the apparatuses, methods, and non-transitory computer readable media disclosed herein, the techniques described herein may be used when a commit is readily identifiable to fix a failing test. Alternatively or additionally, because of the statistical nature of the techniques described herein, the techniques may be applied in cases where the relationship between a failed test and the commit that fixed the failure is not readily identifiable.

For the apparatuses, methods, and non-transitory computer readable media disclosed herein, modules, as described herein, may be any combination of hardware and programming to implement the functionalities of the respective modules. In some examples described herein, the combinations of hardware and programming may be implemented in a number of different ways. For example, the programming for the modules may be processor executable instructions stored on a non-transitory machine-readable storage medium and the hardware for the modules may include a processing resource to execute those instructions. In these examples, a computing device implementing such modules may include the machine-readable storage medium storing the instructions and the processing resource to execute the instructions, or the machine-readable storage medium may be separately stored and accessible by the computing device and the processing resource. In some examples, some modules may be implemented in circuitry.

FIG. 1 illustrates an example layout of a test relevancy prediction for code changes apparatus (hereinafter also referred to as "apparatus 100").

Referring to FIG. 1, the apparatus 100 may include a model training module 102 to train a model 104 by identifying a test and file pair in a set of builds 106. The set of builds 106 may be associated with a failed test and a passed test. According to an example, the passed test may be subsequent to the failed test.

The set of builds 106 may be stored in a data store that includes, for example, a relational database, an object database, a key-value store, or any other mechanism for data storage. The data store may be a file based data store. The data store may be a block based data store. What should be understood is that any device capable of storing data is suitable for use with apparatus 100. The data store may also store the codebase of the software product that is utilizing the test identification techniques disclosed herein. For example, the data store may store all of the source files of the software product. The data store may also store build data, which may include information about previous builds and the results of any regression testing performed on those builds. The data store may also include information related to the commits that were submitted by developers. The data store may also store data related to the files that were included in the commits as well as the relationships those files have with other files as well as with failed tests.

According to an example, the model training module 102 may identify the test and file pair in the set of builds 106 by determining whether a test and the file of the test and file pair are related by using a heuristic. The heuristic may include file commonality between the test and the file of the test and file pair, committer commonality between the test and the file of the test and file pair, and/or a commit message associated with the test and the file of the test and file pair. A commit message may be a line of descriptive text that is associated with the contents of the commit. For example, the commit message may recite a particular feature that is associated with a commit. The commit message may also indicate that a particular commit is associated with a bug fix for a feature.

For the identified test and file pair, a file logging module 108 is to log an occurrence of a file included in the test and file pair. The logging may be associated with the failed test and the passed test.

The file logging module 108 may maintain a count of a number of times the file included in the test and file pair appears in any commit in a build, of the set of builds 106, associated with the passed test.

Further, the file logging module 108 may maintain a pairwise count of a number of times the file included in the test and file pair appears with any other file in a same commit in the set of builds 106.

Once the model 104 is trained, for a new commit that would cause a new build 110, in order to determine which tests are to be applied to the new build 110, a test identification module 112 is to ascertain files for a commit for the new build 110.

For each test of a plurality of tests 114 (e.g., a plurality of available tests), the test identification module 112 is to determine a score 116 based on a weight assigned to a file of the ascertained files.

The test identification module 112 is to order each test of the plurality of tests 114 according to the determined score.

Further, the test identification module 112 is to identify, based on the ordering of each test of the plurality of tests 114, tests 118 from the plurality of tests 114 for which the score 116 exceeds a specified threshold 120. In this regard, the identified tests 118 may represent tests that are to be applied to the new build 110.

According to an example, the test identification module 112 is to determine the weight based on a term frequency-inverse document frequency (TF-IDF) statistic.

According to an example, the test identification module 112 is to determine, for a file of the ascertained files that does not include an associated test, the weight based on a dice measure.

After determination of the scores for each test in relation to the files in the commit, a test performance module 122 may generate results that include the tests 118, where a user may apply the tests 118 to the new build 110. Alternatively or additionally, the test performance module 122 may execute the tests 118 with respect to a dynamic Continuous Integration job, and apply the tests 118 to the new build 110.

According to an example, with respect to the tests 118, the test performance module 122 may execute all tests 118 which represent tests with a score greater than a specified threshold. Alternatively or additionally, the test performance module 122 may execute tests with highest scores, which amount to Y percent of the collective score.

FIG. 2 illustrates an example of build related data that may be stored and utilized by the techniques described herein.

Referring to FIGS. 1 and 2, two measures of the likelihood of a commit in a particular file causing a test failure may be determined based on statistical methods. In order to identify these measures, the model training module 102 may identify Continuous Integration builds in which tests fail, and builds in which the failure is fixed (e.g., resolved) by analyzing the build sequences. An example of build sequences is illustrated in FIG. 2. In the example of FIG. 2, Build-2 includes one failed test (e.g., test TTT), and Build-3, which is subsequent to Build-2, includes no failed tests. For Build-2, any one of the six commits may have resulted in failure of the test TTT. For Build-3, since there are no failed tests, a commit in Build-3 may be determined to have fixed the failed test TTT from Build-2. The single commit in Build-3 may include the files a.java, b.js, and c.groovy.

In the training phase of the model 104, the model training module 102 may detect such sequences (e.g., sequences of builds that have a failing test and then a build which has a fix), and generate a collection which includes a test and the files that were committed and caused the test not to fail.

FIG. 3 illustrates an example of a test and file pair collection that may be stored and utilized by the techniques described herein.

Referring to FIG. 3, the file logging module 108 is to collect (e.g., by logging) each test-file pair along with the number of occurrences of the file in commits related to the test. This may indicate the connection strength between the test and the file. Further, the file logging module 108 may collect similar counts to measure the connection between pairs of files, for example, by counting their appearances in mutual commits.

For the example of FIGS. 2 and 3, for test TTT, the files a.java, b.js, and c.groovy may each include a count of one.

FIG. 4 illustrates an example of build related data that may be stored and utilized by the techniques described herein. Further, FIG. 5 illustrates an example of test and file pair collections that may be stored and utilized by the techniques described herein.

Referring to FIGS. 2-5, assuming that the build sequence of FIG. 2 further includes Build-5 and Build-6 as shown in FIG. 4, the test and file pair of FIG. 3 may be modified as shown in FIG. 5. For example, assuming that Build-5 includes ten commits which caused two failed tests (e.g., tests TTT and MMM), Build-6 that includes no failed tests may form a sequence with Build-5. In this regard, Build-6 may include two commits, with the first commit including file a.java, and the second commit including files fjs and m.java. For the example of FIGS. 4 and 5, for test TTT, the files a.java may include a count of two (e.g., based on Build-2 and Build-3, and Build-5 and Build-6), and the files b.js, c.groovy, fjs, and m.java may each include a count of one. Further, for test MMM, the files fjs, and m.java may each include a count of one.

FIG. 6 illustrates an example of file collections that may be stored and utilized by the techniques described herein.

Referring to FIGS. 5 and 6, the collections of FIG. 5 map tests to the files which are related to the tests. However, as shown in FIG. 6, the collections of FIG. 5 may be transformed to create collections that map files to tests. In this regard, determination of which test to apply to a build as disclosed herein may be expedited, where for each file, all of the tests where the file appears with the connection score as disclosed herein may be collected. The transformed collections in this regard may be denoted "file collections". For the example of FIGS. 4 and 5, the collections for file a.java and fjs are shown in FIG. 6.

Once the model 104 is trained by the model training module 102 as disclosed herein with respect to FIGS. 2-6, for a new commit that would cause the new build 110, in order to determine which tests are to be applied to the new build 110, the test identification module 112 is to ascertain files for a commit for the new build 110. For example, assuming that a new commit is to be pushed into a Source Control Management system, which will cause a new build, the test identification module 112 may iterate over the commit files. Further, the test identification module 112 may determine term frequency-inverse document frequency (TF-IDF) statistics. The test identification module 112 may determine the score 116 of each test as the sum of the TF-IDF measure of its related commit files as follows:

$$TF(file, test) = K + (1-K) f\_(file, test) / \max\_(\{file' \in test\}) [(f\_(file''', test))] \quad \text{Equation}(1)$$

For Equation (1), K may represent a constant from the range [O,1). According to an example, K may be set to 0 (e.g., K=0). The f_(file, test) may represent the count of the current file with relation to the current test (f may represent the frequency, file and test may respectively represent the "term" and "document" respectively in the definition of TF). This measure may be retrieved from the aforementioned "file collections" as disclosed herein with reference to FIG. 6. Further, for Equation (1), max_({file'∈test})[(f_(file^", test))] may represent the maximal count of any file with relation to the specific test. This measure may be retrieved from the "test collections" as disclosed herein with respect to FIGS. 3 and 5.

With respect to the inverse document frequency (IDF) component of the term frequency-inverse document frequency (TF-IDF) statistic, the IDF may be determined as follows:

$$idf(\text{file, Tests}) = \log\left[\left(\frac{|\text{Tests}|}{|\{test \in \text{Tests} | file \in test\}|}\right)\right] \quad \text{Equation (2)}$$

For Equation (2), |Tests| may represent the total number of unique tests, whereas the denominator (|{test∈Tests|file∈test}|) may represent the number of tests that the current file appears in relation to.

The term frequency-inverse document frequency (TF-IDF) statistic may provide for the assignment of a weight to each file that reflects the file's relevance in relation to the test. The TF-IDF may provide a measure of the direct association between files and tests.

As disclosed herein, the test identification module 112 may determine, for a file of the ascertained files that does not include an associated test, the weight based on a dice measure. In this regard, the dice measure may represent an indirect association between files and tests. The dice measure may be specified as follows:

$$\text{Dice}(f1,f2) = (2*P(f1,f2))/(P(f1)+P(f2)) \quad \text{Equation (3)}$$

For Equation (3), f1 and f2 may represent the given files, P(f1) and P(f2) may represent the probabilities of observing f1 and f2 without regard to each other, and P(f1, f2) may represent the probability of observing f1 and f2 together.

The dice measure may be determined for a file without a direct association to any test. For example, when iterating through commit files, if one of the files (fi) does not include a direct association to test (T) which has some connection to another file or files in the commit, the association score which is allocated to file fi may be determined as follows:

$$\max_{T}(f'' \in T)\left[\text{Dice}(fi,f')\right] \quad \text{Equation (4)}$$

With respect to Equations (1) to (4), these two measures may be used to rank tests by the likelihood that they will cause the new build 110 to fail, and therefore are relevant to run prior to pushing the commit to the repository where the codebase resides (and on which Continuous Integration jobs operate).

The test identification module 112 may determine the relevancy score 116 of a test as the sum of the scores determined with relation to each file of the commit.

With respect to training of the model 104 by the model training module 102, the model training module 102 may ascertain and incorporate other features for training of the model 104. Other features may include, for example, the user who performed the file changes (or the committer with respect to an already existing commit), the committer's team, an area of application which a test covers, an area of application related to the commit (extracted, for example, from the description of the commit), the file extension for the test file, and the file extension for the committed file.

With respect to an example of application of the model 104, and Equations (1) to (4) described above, suppose that the following apply:

Test T1 has a test model with two files file1.java with count 2 and file2.java with count 3.

Test T2 has a test model with a single file file3.java with count 2.

File file1.java has a file model with a single file file4.java with count 2.

File file1.java appeared in four commits overall and so did file4.java (out of these times they appeared twice in common).

File file2.java has a file model with a single file file5.java with count 5.

File file3.java has a file model with a single file file5.java with count 5.

The overall number of tests is eight, and the other test models do not include any of the above files.

Given a new build with committed files {file1.java, file4.java}

For test T1:

TF-IDF for file file1.java is TF=⅔ *IDF=Log(8/1)= ⅔ *3=2//Log basis is 2.

TF-IDF score cannot be determined for T1 for file file4.java and so the dice score is determined: 2*2/(4+4)=0.5.

The dice score for file4.java through file2.java is 0 (since the joint number of appearances is 0) and thus the max dice score is 0.5.

For test T2:

Since neither file1.java nor file4.java are linked to test T2 their TF-IDF score cannot be determined.

Since neither file1.java nor file4.java ever appeared with the only file linked to T2 (namely file3.java) both of their dice score is 0.

Hence, with a TF-IDF threshold of 1 and a Dice score threshold of 0.6, T1 would be included (due to file1.java) in the test set to execute, whereas T2 would not be included.

Figure 7:
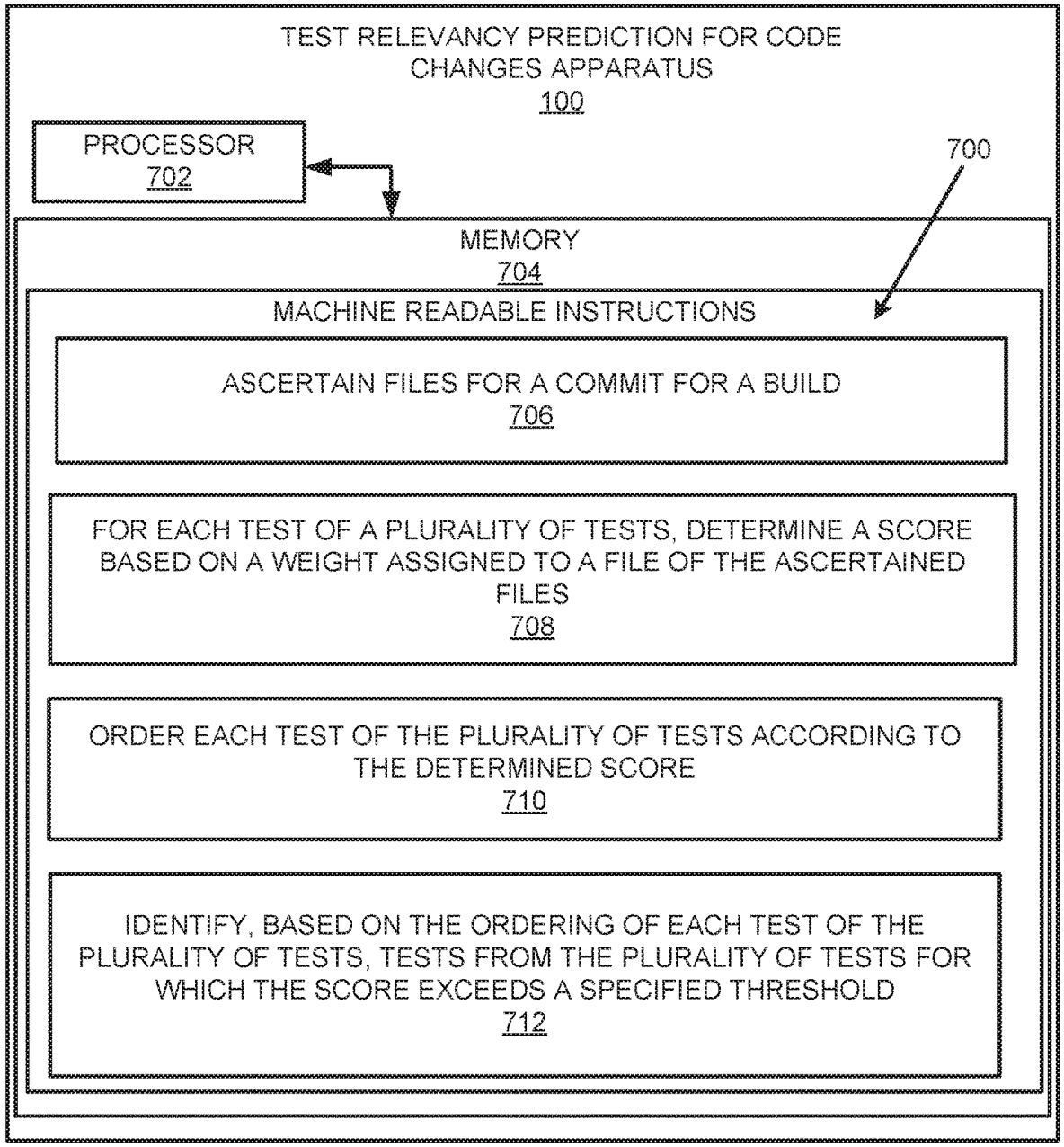
FIG. 7 illustrates an example block diagram for test relevancy prediction for code changes.
Figure 8:
FIG. 8 illustrates an example flowchart of a method for test relevancy prediction for code changes.
Figure 9:
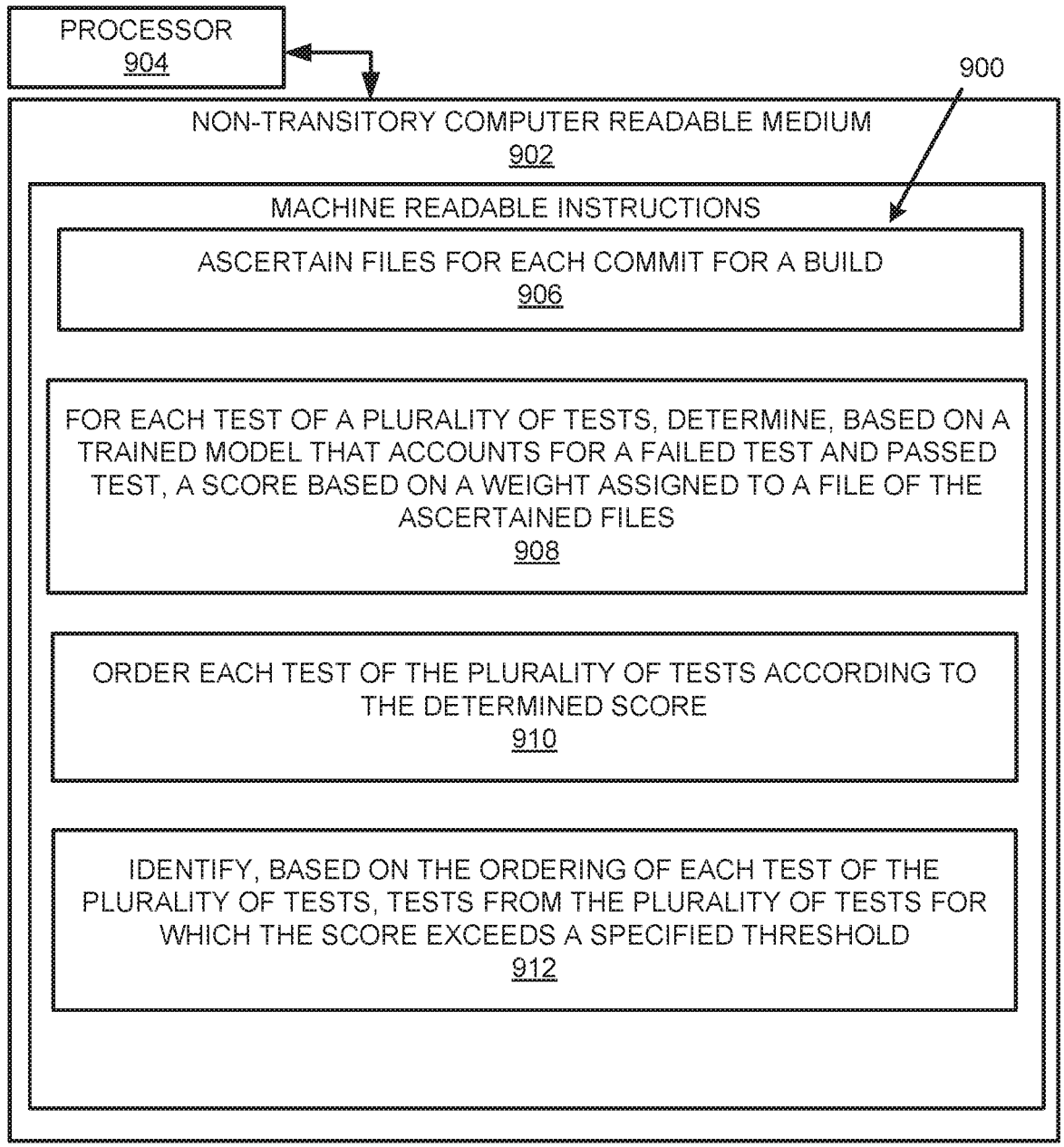
FIG. 9 illustrates a further example block diagram for test relevancy prediction for code changes.

FIGS. 7-9 respectively illustrate an example block diagram 700, an example flowchart of a method 800, and a further example block diagram 900 for test relevancy prediction for code changes. The block diagram 700, the method 800, and the block diagram 900 may be implemented on the apparatus 100 described above with reference to FIG. 1 by way of example and not limitation. The block diagram 700, the method 800, and the block diagram 900 may be practiced in other apparatus. In addition to showing the block diagram 700, FIG. 7 shows hardware of the apparatus 100 that may execute the instructions of the block diagram 700. The hardware may include a processor 702, and a memory 704 (i.e., a non-transitory computer readable medium) storing machine readable instructions that when executed by the processor cause the processor to perform the instructions of the block diagram 700. The memory 704 may represent a non-transitory computer readable medium. FIG. 8 may represent a method for test relevancy prediction for code changes, and the steps of the method. FIG. 9 may represent a non-transitory computer readable medium 902 having stored thereon machine readable instructions to provide test relevancy prediction for code changes. The machine readable instructions, when executed, cause a processor 904 to perform the instructions of the block diagram 900 also shown in FIG. 9.

The processor 702 of FIG. 7 and/or the processor 904 of FIG. 9 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 902 of FIG. 9), such as hardware storage devices (e.g., RAM (random access memory), ROM (read only memory), EPROM (erasable, programmable ROM), EEPROM (electrically erasable, programmable ROM), hard drives, and flash memory). The memory 704 may include a RAM, where the machine readable instructions and data for a processor may reside during runtime.

Referring to FIGS. 1-7, and particularly to the block diagram 700 shown in FIG. 7, the memory 704 may include instructions 706 to ascertain files for a commit for a build (e.g., the new build 110).

The processor 702 may fetch, decode, and execute the instructions 708 to, for each test of a plurality of tests 114, determine a score 116 based on a weight assigned to a file of the ascertained files.

The processor 702 may fetch, decode, and execute the instructions 710 to order each test of the plurality of tests 114 according to the determined score 116.

The processor 702 may fetch, decode, and execute the instructions 712 to identify, based on the ordering of each test of the plurality of tests 114, tests 118 from the plurality of tests 114 for which the score 116 exceeds a specified threshold 120. The identified tests 118 may represent tests 118 that are to be applied to the build (e.g., the new build 110).

Referring to FIGS. 1-6 and 8, and particularly FIG. 8, for the method 800, at block 802, the method may include identifying, by a processor, a test and file pair in a set of builds 106. The set of builds 106 may be associated with a failed test and a passed test.

At block 804 the method may include, for the identified test and file pair, logging an occurrence of a file included in the test and file pair, where the logging is associated with the failed test and the passed test.

Referring to FIGS. 1-6 and 9, and particularly FIG. 9, for the block diagram 900, the non-transitory computer readable medium 902 may include instructions 906 to ascertain files for each commit for a build (e.g., the new build 110).

The processor 904 may fetch, decode, and execute the instructions 908 to, for each test of a plurality of tests 114, determine, based on a trained model 104 that accounts for a failed test and passed test, a score 116 based on a weight assigned to a file of the ascertained files.

The processor 904 may fetch, decode, and execute the instructions 910 to order each test of the plurality of tests 114 according to the determined score 116.

The processor 904 may fetch, decode, and execute the instructions 912 to identify, based on the ordering of each test of the plurality of tests 114, tests 118 from the plurality of tests 114 for which the score 116 exceeds a specified threshold 120. The identified tests 118 may represent tests 118 that are to be applied to the build (e.g., the new build 110).

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus comprising:
   a processor; and
   a non-transitory computer readable medium storing machine readable instructions that when executed by the processor cause the processor to:
   ascertain files for a commit for a build;
   for each test of a plurality of tests, determine a score based on a term frequency-inverse document frequency (TF-IDF) statistic that accounts for a number of files, from the ascertained files, that are associated with a test;
   for each test of the plurality of tests, further determine the score based on a weight assigned to a file of the ascertained files as a function of unique tests of the plurality of tests and a number of tests of the plurality of tests that the file of the ascertained files is related to;
   order each test of the plurality of tests according to the determined score;
   identify, based on the ordering of each test of the plurality of tests, tests from the plurality of tests for which the score exceeds a specified threshold, wherein the identified tests represent tests that are to be applied to the build; and
   perform, based on application of the identified tests to the build, regression testing of the build.

2. The apparatus according to claim 1, wherein the instructions are further to cause the processor to:
   determine, for a file of the ascertained files that does not include an associated test, another score based on a dice measure.

3. The apparatus according to claim 1, wherein the instructions are further to cause the processor to:
   train a model determine the score by
   identifying a test and file pair in a set of builds, wherein the set, of builds is associated with a failed test and a passed test, and
   for the identified test and file pair, logging an occurrence of a file included in theth_e test and file pair, the logging associated with the failed test and the passed test.

4. The apparatus according to claim 3, wherein the set of builds is associated with the failed test and the passed test that is subsequent to the failed test.

5. The apparatus according to claim 3, wherein the instructions are further to cause the processor to:
   maintain a count of a number of times the file included in the test and file pair appears in any commit in a build, of the set of builds, associated with the passed test.

6. The apparatus according to claim 3, wherein the instructions are further to cause the processor to:
   maintain a pairwise count of a number of times the file included in the test and file pair appears with any other file in a same commit in the set of builds.

7. The apparatus according to claim 3, wherein the instructions are further to cause the processor to:
   identify the test and file pair in the set of builds by determining whether a test and the file of the test and file pair are related by using a heuristic.

8. The apparatus according to claim 7, wherein the heuristic is committer commonality between the test and the file of the test and file pair.

9. A method comprising:

ascertaining, by a processor, files for a commit for a build;

for each test of a plurality of tests, determining a score based on a weight assigned to a file of the ascertained files, wherein the weight is determined as a function of a count of the file with respect to an associated test and as a function of unique tests of the plurality of tests and a number of tests of the plurality of tests that the file of the ascertained files is related to, and wherein the score is further determined by training a model to determine the score by:

identifying a test and file pair in a set of builds, Wherein the set of builds is associated with a failed test and a passed test; and for the identified test and file pair, togging an occurrence of the file included in the test and file pair, the logging associated with the failed test and the passed test;

ordering each test of the plurality of tests according to the determined score;

identifying, based on the ordering of each test of the plurality of tests, tests from the plurality of tests for which the score represents a highest score as a specified percentage of a collective score, wherein the identified tests represent tests that are to be applied to the build; and performing, based on application of the identified tests to the build, regression testing of the build.

10. The method according to claim 9, wherein the set of builds is associated with the failed test and the passed test that is subsequent to the failed test.

11. The method according to claim 9, further comprising:

maintaining a count of a number of times the file included in the test and file pair appears in any commit in a build, of the set of builds, associated with the passed test.

12. The method according to claim 9, further comprising:

maintaining a pairwise count of a number of times the file included in the test and file pair appears with any other file in a same commit in the set of builds.

13. The method according to claim 9, further comprising:

identifying the test and file pair in the set of builds by determining whether a test and the file of the test and file pair are related by using a heuristic.

14. The method according to claim 13, wherein the heuristic is a commit message associated with the test and the file of the test and file pair.

15. A non-transitory computer readable medium having stored thereon machine readable instructions, the machine readable instructions, when executed, cause a processor to:

ascertain files for each commit for a build;

for each test of a plurality of tests, determine, based on a trained model that accounts for a failed test and passed test, a term frequency—inverse document frequency (TF-IDF) score based on a TF-IDF statistic that accounts for a number of files, from the ascertained files, that are associated with a test, and based on a weight assigned to a file of the ascertained files as a function of unique tests of the plurality of tests and a number of tests of the plurality of tests that the file of the ascertained files is related to:

determine, for a file of the ascertained files that does not include an associated test, a dice score based on a dice measure;

order each test of the plurality of tests according to the determined TF-IDF score and the determined dice score;

identify, based on the ordering of each test of the plurality of tests, tests from the plurality of tests for which the TF-IDF score exceeds a TF-IDF threshold and the dice score exceeds a dice threshold, wherein the identified tests represent tests that are to be applied to the build; and perform, based on application of the identified tests to the build, regression testing of the build.

16. The non-transitory computer readable medium according to claim 15, wherein the machine readable instructions, when executed, further cause the processor to:

train the model by identifying a test and file pair in a set of builds, wherein the set of builds is associated with the failed test and the passed test, and for the identified test and file pair, logging an occurrence of a file included in the test and file pair, the logging associated with the failed test and the passed test.

* * * * *